US012805429B2

(12) United States Patent
Johnson et al.

(10) Patent No.: US 12,805,429 B2
(45) Date of Patent: Nov. 24, 2026

(54) MULTI-MOTOR COMMON DRIVE SYSTEM FOR SEED METERS

(71) Applicant: Great Plains Manufacturing, Inc., Salina, KS (US)

(72) Inventors: Gerald R. Johnson, Newton, KS (US); Donald H. Riffel, Smolan, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 321 days.

(21) Appl. No.: 18/584,762

(22) Filed: Feb. 22, 2024

(65) Prior Publication Data

US 2025/0268125 A1 Aug. 28, 2025

(51) Int. Cl.
*A01C 19/02* (2006.01)
*A01C 7/12* (2006.01)

(52) U.S. Cl.
CPC ................ *A01C 19/02* (2013.01); *A01C 7/12* (2013.01)

(58) Field of Classification Search
CPC ................................. A01C 19/02; A01C 7/12
See application file for complete search history.

(56) References Cited

U.S. PATENT DOCUMENTS

| | | | | |
|---|---|---|---|---|
| 7,617,785 B2 * | 11/2009 | Wendte | .................. | A01C 19/02 111/921 |
| 11,006,566 B2 | 5/2021 | Hause et al. | | |
| 11,121,650 B2 | 9/2021 | Froelich | | |
| 2019/0050002 A1 * | 2/2019 | Engel | ....................... | A01C 7/12 |
| 2021/0123441 A1 | 4/2021 | Coupart et al. | | |

FOREIGN PATENT DOCUMENTS

| | | | | |
|---|---|---|---|---|
| EP | 4342277 | 3/2024 | | |
| WO | WO-2017040533 A1 * | 3/2017 | ............. | A01C 7/124 |

OTHER PUBLICATIONS

Anish Devasia; An Introduction to Types of Closed-loop Motor Control; https://control.com/technical-articles/in-introduction-to-types-of-closed-loop-motor-control/; EETech Media, LLC; Jan. 6, 2023; 7 pages.

* cited by examiner

*Primary Examiner* — Matthew R Buck
(74) *Attorney, Agent, or Firm* — Hovey Williams LLP; Kameron D. Kelly

(57) ABSTRACT

A drive system for delivering a plurality of seeds into a number of furrows via a number of seed meters. The drive system comprises a meter shaft drivably connectable to the seed meters and a number of electric motors drivably connected to the meter shaft for actuating the seed meters via the meter shaft.

22 Claims, 9 Drawing Sheets

MULTI-MOTOR COMMON DRIVE SYSTEM FOR SEED METERS

FIELD OF THE INVENTION

Embodiments of the present invention are directed generally to agricultural implements for seeding. In more detail, embodiments of the present invention are directed to agricultural implements that include seed bins and seed metering devices for dispensing seed and other agricultural products.

BACKGROUND OF THE INVENTION

Certain agricultural implements, such as seed drills are configured to dispense agricultural products (e.g., seed and/or treatment) into or onto the ground. Commonly, a seed drill will include one or more bins that hold agricultural product. As the seed drill is pulled through a field by a tractor or other prime mover, agricultural product can be dispensed from the bins via a plurality of metering devices associated with the bins.

Metering devices of agricultural implements are often powered by a ground drive (i.e., movement of the agricultural implements imparts movement of the metering devices) or by an electronic control unit (ECU) controlled hydraulic drive. Ground drives are convenient, but not very versatile because the travel speed of the agricultural implements across the ground dictates the metering speed of the metering devices. ECU controlled hydraulic drives introduce metering control independent of ground speed, but are undesirably complex.

An electric motor drive is simple and provides electronic metering control independent of ground speed, but powering several metering devices requires a large RPM range. A large, expensive motor is needed for the upper end of the RPM range but is oversized in some stages of operation. Furthermore, using several small electric motors to drive individual metering devices is undesirable because additional drive trains will be required and the additional electric motors introduces several potential points of failure.

SUMMARY OF THE INVENTION

In one embodiment of the present invention, there is provided a drive system for delivering seeds into a number of furrows via a number of seed meters. The drive system comprises a meter shaft drivably connectable to the seed meters. The drive system further includes a number of electric motors drivably connected to the meter shaft for actuating the seed meters via the meter shaft.

In another embodiment of the present invention, there is provided a seed drill comprising a drive system for delivering seeds into a number of furrows and a control system for controlling the drive system. The drive system includes a number of seed meters, a meter shaft, and a number of electric motors. Each seed meter is configured to deliver some of the seeds into one of the furrows. The meter shaft is drivably connected to the seed meters. The electric motors are drivably connected to the meter shaft for actuating the seed meters via the meter shaft. The electric motors include a first electric motor operating as a lead motor and a second electric motor operating as a follower motor. The control system is communicatively connected to the first electric motor and is configured to transmit a command signal to the first electric motor for activating the first electric motor to achieve a first operating state.

In a further embodiment of the present invention, there is provided a seed drill comprising a drive system for delivering a number of seeds into a number of furrows and a control system for controlling the drive system. The drive system includes a number of seed meters, a meter shaft, a number of electric motors, and a drive train. Each seed meter is configured to deliver some of the seeds into one of the furrows. The meter shaft is drivably connected to the seed meters. The electric motors are drivably connected to the meter shaft for actuating the seed meters via the meter shaft. The electric motors include a first electric motor operating as a leader motor and a second electric motor operating as a follower motor. The second electric motor is configured to be switched to operating as a leader motor. The electric motors have different operating specifications from each other. The drive train drivably connects the first electric motor and the second electric motor to the meter shaft at one axial location on the meter shaft. The control system is communicatively connected to the first electric motor and configured to transmit a command signal via pulse width modulation (PWM) control area network (CAN) communication or a similar communication scheme to the first electric motor for activating the first electric motor to achieve a first operating state. The second electric motor is synchronized with the first electric motor to achieve a second operating state substantially equal to the first operating state. The first and second operating states are at least one of a speed, a torque, an electric current (e.g., an electric current input or consumption at one of the first and second electric motors or an electric current output from the controller), voltage, and a direction of rotation.

A further embodiment of the invention is a method of planting seeds. The method comprises steps of (a) connecting a common meter shaft to a plurality of individual seed meters so that rotation of the common meter shaft causes rotation of the plurality of individual seed meters; (b) driving rotation of the common meter shaft in a first operating state where n individual electric motors power rotation of the common meter shaft; and (c) driving rotation of the common meter shaft in a second operating state where m individual electric motors power rotation of the common meter shaft. The number of individual electric motors m is at least one more than n.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein.

Figure 1:
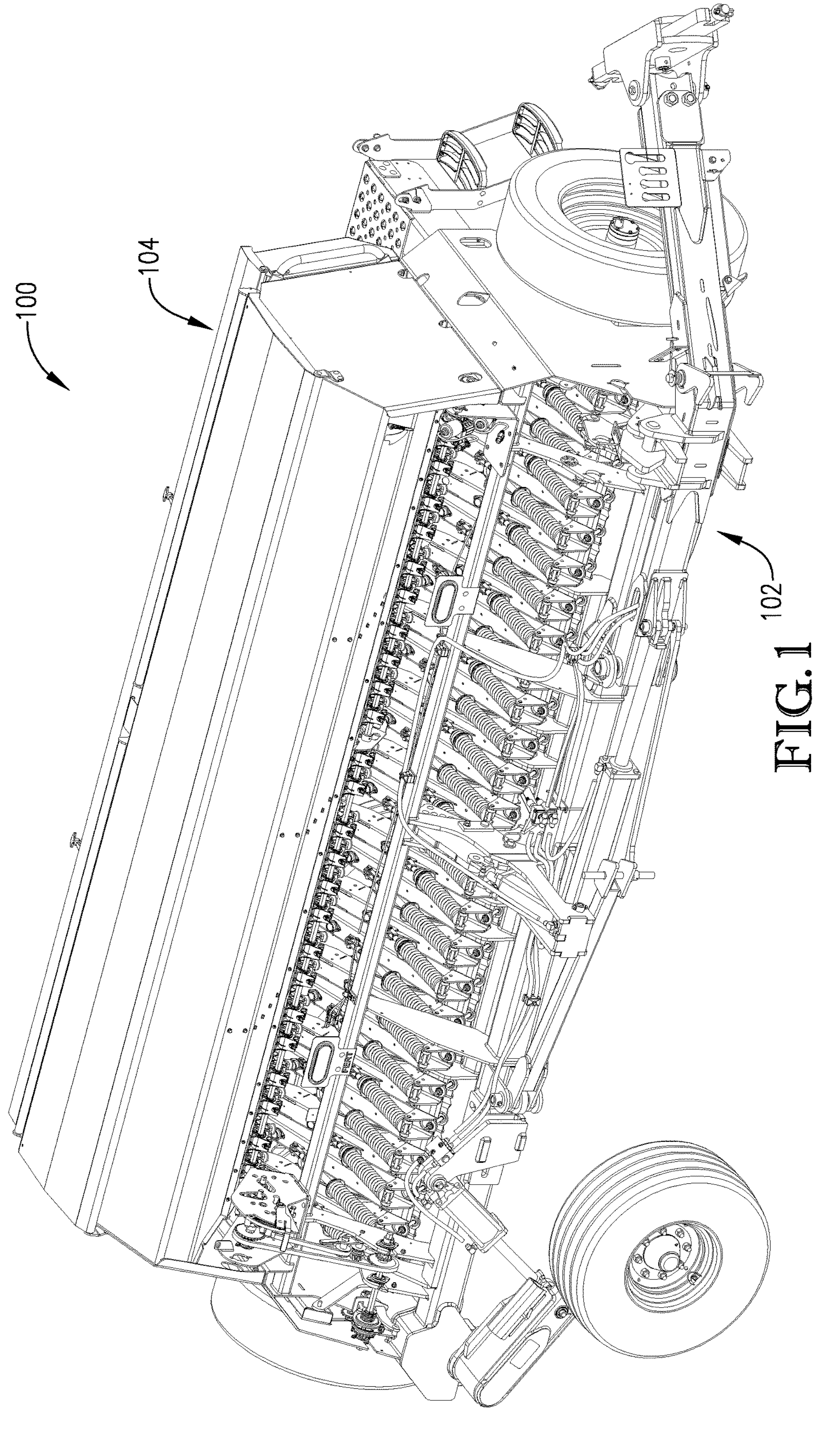
FIG. 1 is a top perspective view of an agricultural implement according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Embodiments of the present invention are directed generally to agricultural implements, such as seed and/or treatment drill 100 illustrated in FIG. 1. The drill 100 may comprise a frame 102 that is towed by a tractor or other prime mover (not shown). The frame 102 may support a bin 104 that extends laterally across the frame 102. As will be described in more detail below, the bin 104 is configured to hold agricultural products, such as seed and/or treatment (e.g., fertilizer, pesticides, etc.), for dispensing into and/or onto the ground. In some embodiments, the bin 104 may be divided into multiple containment sections that are each configured to hold distinct types of agricultural product. For instance, the bin 104 may include a forward containment section 151 and a rearward containment section 152. As such, the forward containment section 151 may be configured to hold a first type of agricultural product (e.g., seed), while the rearward containment section 152 may be configured to hold a second type of agricultural product (e.g., treatment). As used herein, the term "treatment" may refer to fertilizers, pesticides, herbicides, nutrients, or other additives used in connection with seeding.

Figure 2:
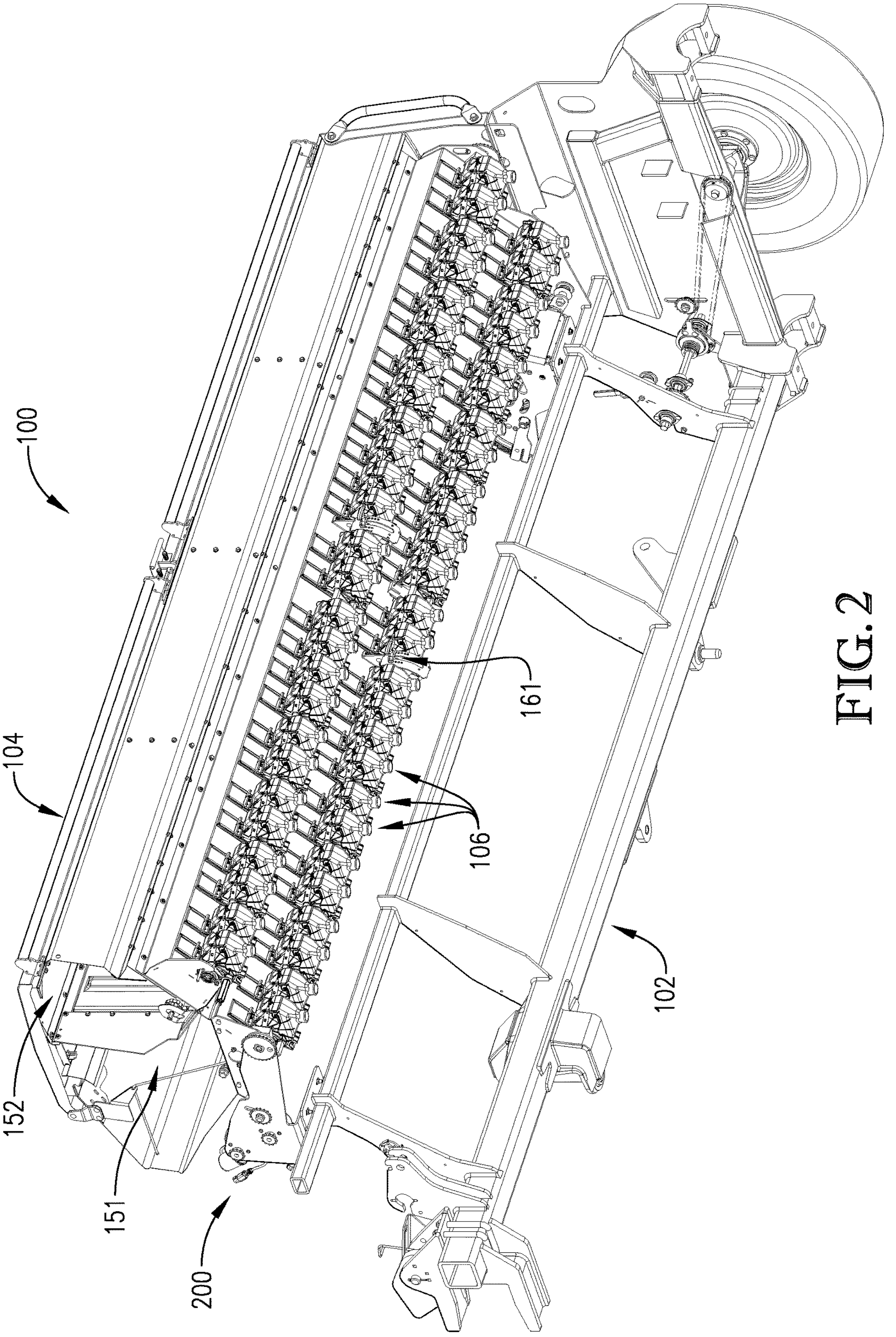
FIG. 2 is a bottom perspective view of portions of the agricultural implement of FIG. 1.

To facilitate dispensing of agricultural product, the drill 100 may additionally comprise a plurality of metering devices 106 secured to a bottom side of the bin 104, such as illustrated in FIG. 2. In instances in which the bin 104 is divided into multiple containment sections 151, 152, embodiments may provide for a plurality of metering devices 106 to be secured to a bottom of each containment section. The metering devices 106 (lower row in FIG. 2) associated with containment section 151 are driven via a drive system 200, which will be described in more detail below. Metering devices (upper row in FIG. 2) associated with containment section 152 may be driven via a conventional drives system such as a ground drive or electronic control unit (ECU) hydraulic drive (which will not be described further). Alternatively, the metering devices associated with containment section 152 may be driven by a drive system similar to drive system 200.

Figure 3:
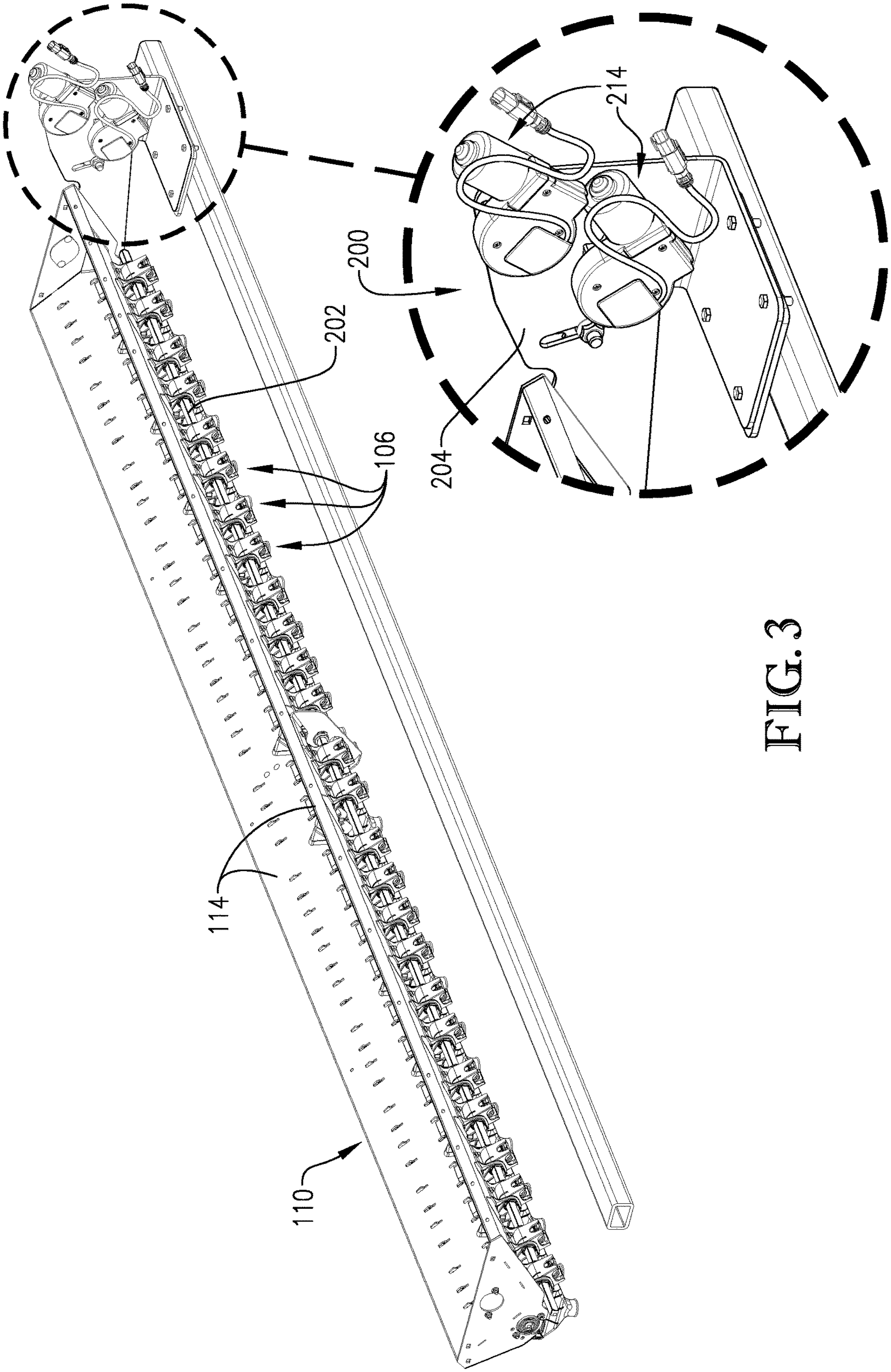
FIG. 3 is a top perspective view of certain components of the agricultural implement of FIG. 1.
Figure 4:
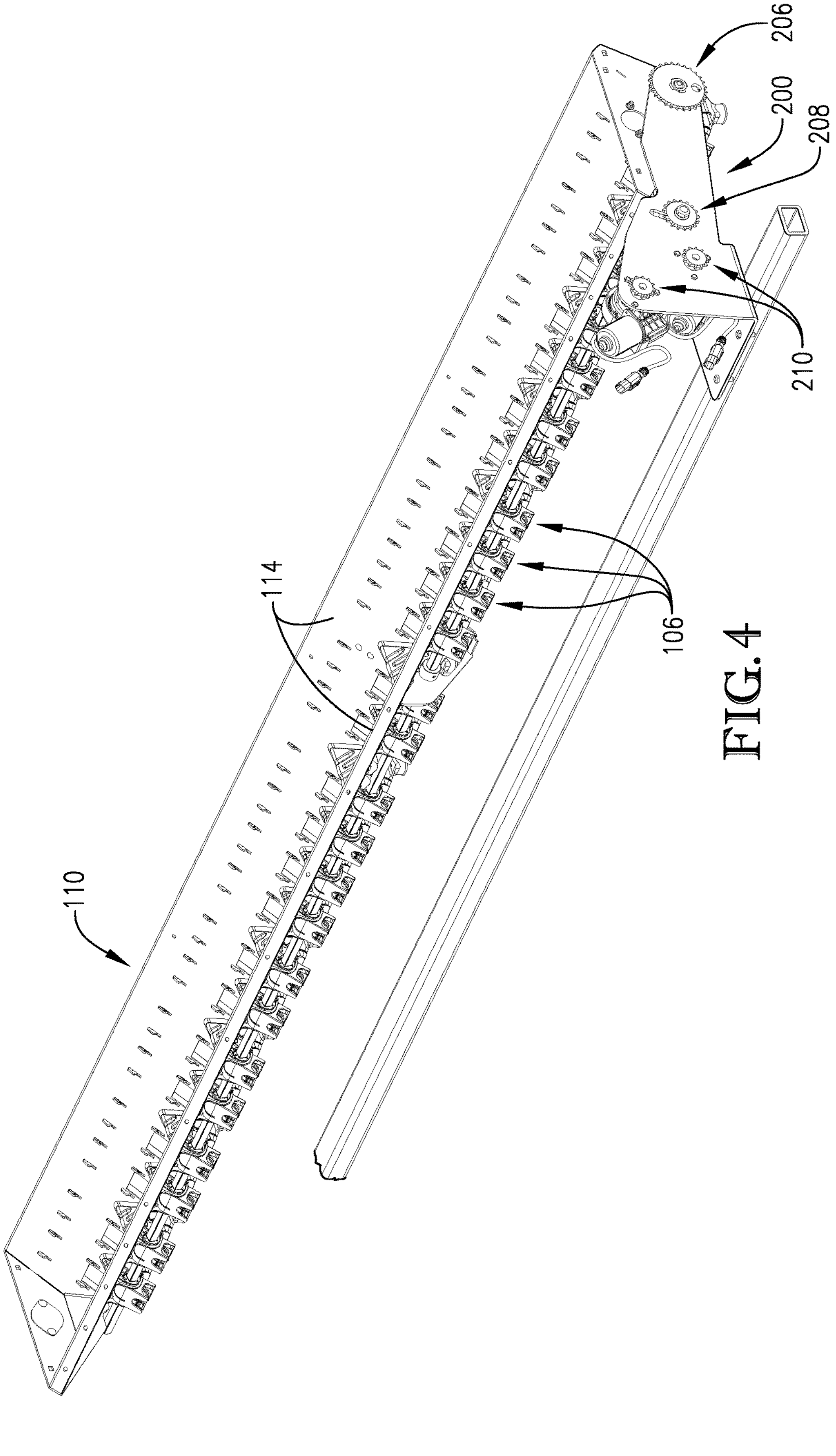
FIG. 4 is another top perspective view of certain components of the agricultural implement of FIG. 1.

The bin 104 may comprise a generally rectangular container configured to hold agricultural products (e.g., seed and/or treatment). Turning to FIGS. 3 and 4, a bottom section 110 of the bin 104 may be formed in a triangular or funnel shape. In some embodiments, the bin 104 may include an individual bottom section 110 associated with each containment section 151, 152. The bottom section 110 may include a plurality of product openings 112 (FIG. 5).

Agricultural product held within the bin 104 will be funneled downward under the force of gravity towards the product openings 112, such that the agricultural product can pass through the product openings 112 to the metering devices 106 that function to dispense the agricultural product from the bin 104 into or onto the ground. To promote efficient funneling and mixing of the agricultural product within the bin 104, some embodiments may provide for the bin 104 to include a mixing assembly (not shown) extending through the interior space of the bin 104. Such mixing assemblies may include a rotatable shaft that extends through a length of the bin 104 and includes a plurality of mixing arms extending therefrom. Embodiments may provide for the rotatable shaft to be rotated in different directions and/or at different rotational speeds. Alternatively, the rotatable shaft may rotate at a generally constant speed and direction. Regardless, rotation of the rotatable shaft will cause the mixing arms to mix the agricultural product within the bin 104 so as to ensure proper mixing, funneling, and flow of the agricultural product through the bin 104. In some additional embodiments, oscillators and/or agitators may be used to ensure proper mixing, funneling, and flow of the agricultural product through the bin 104.

Figure 5:
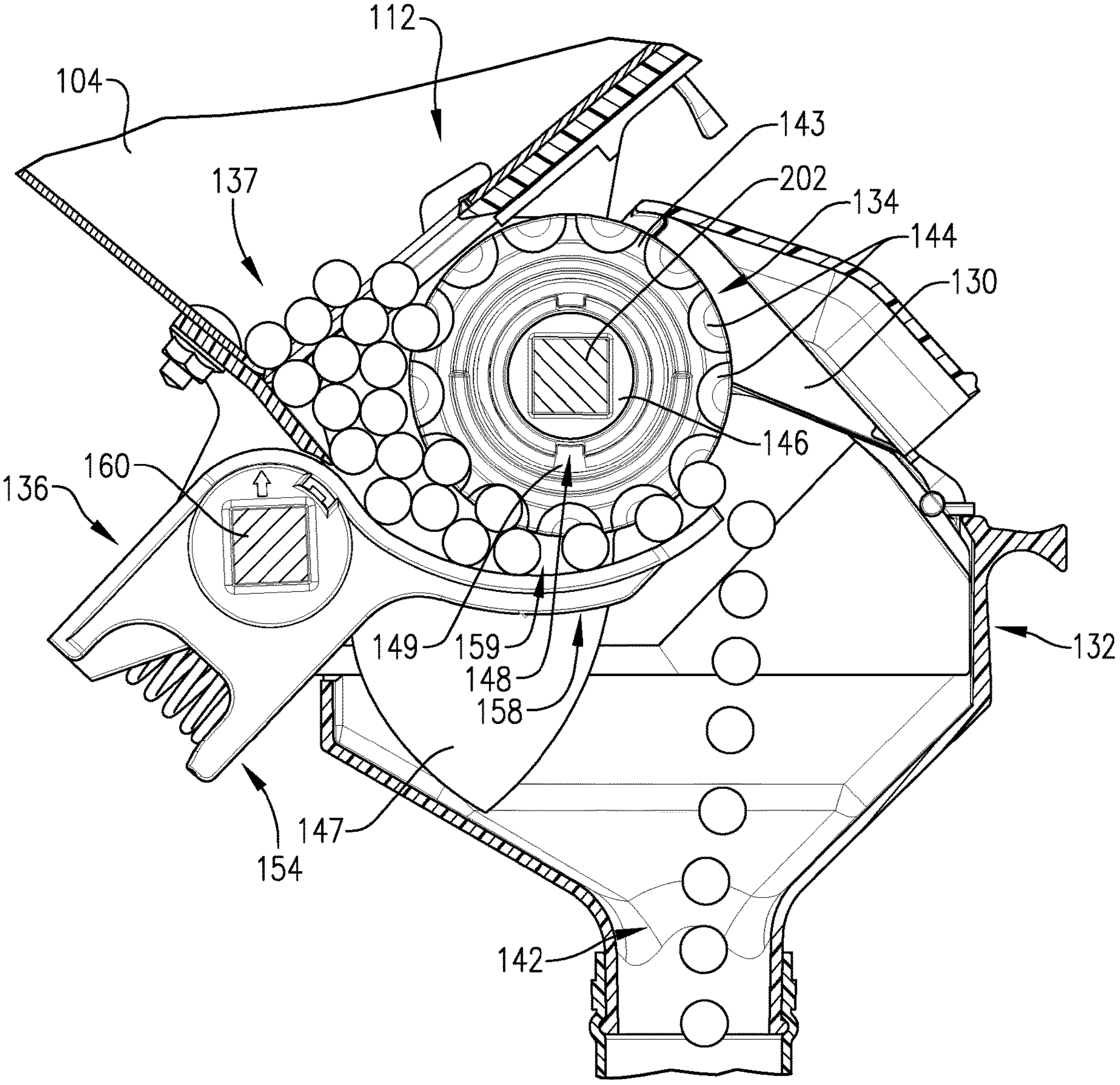
FIG. 5 is a cutaway side elevation view of certain components of the agricultural implement of FIG. 1.

Turning now to the metering devices 106 in more detail, as illustrated in FIG. 5, each metering device 106 may comprise an upper housing 130, a lower housing 132 removably engaged with the upper housing 130, a metering assembly 134 removably secured within an interior of the upper and/or lower housing 130, 132, and a gate assembly 136 removably secured within an interior of the upper and/or lower housing 130, 132. In operation of the drill 100, a plurality of the metering devices 106 may be secured to an exterior bottom surface of the bin 104. Thus, agricultural product can be passed from the bin 104 to the metering device 106, such that the metering assembly 134 can convey the agricultural product through the metering device 106 and out of the metering device 106 where the agricultural product is dispensed into or onto the ground.

The upper housing 130 may present a product inlet 137 through selective opening of product doors (not shown) slidingly engaged with the top end of the upper housing 130. Each of the product doors can be slidingly actuated between a closed position and an open position. In a closed position, the product doors restrict agricultural product from entering the metering device 106. In contrast, in an open position, the product doors permit agricultural product to enter the metering device 106 via the presented product inlet 137. In some embodiments, each of the product doors can be partially opened to various levels of extension (i.e., positions between completely closed and completely open) so as to regulate how much agricultural product can be provided into the metering device 106.

As will be described in more detail below, the interior space of the metering device 106 may be divided into two agricultural product sections (e.g., a first agricultural product section and a second agricultural product section), such that two different types of agricultural product can be separately processed through the metering device 106. To facilitate such separate processing, the product doors can be individually actuated. For instance, in order to supply a first agricultural product from the bin 104 to the metering device 106, a first one of the product doors can be opened and a second one of the product doors can be closed so that the first agricultural product can be passed from the bin 104 to the interior space of the metering device 106 via the product unlet 137 presented by the opened first product door. In contrast, to supply a second agricultural product from the bin 104 to the metering device 106, the second product door can be opened, and the first product door can be closed. As such, the second agricultural product can be passed from the bin 104 to the interior space of the metering device 106 via the product inlet 137 presented by the opened second product door.

Upon agricultural product being received into the upper housing 130 of the metering device 106, via the product inlet 137 presented by either the first product door or second product door, the agricultural product can be conveyed through metering device 106, via the metering assembly 134. By way of such conveyance, the agricultural product can be dispensed from the lower housing 132 via a product outlet 142. As illustrated in the drawings, the lower housing 132 may be shaped generally as a funnel with an upper end secured to the upper housing 130 and the product outlet 142 positioned a bottom end of the lower housing 132. As such, agricultural product can be dispensed from the metering device 106 via the product outlet 142 of the lower housing 132.

Embodiments provide for the metering devices 106 to convey various types of agricultural products. To facilitate such conveyances, the metering assembly 134 of the metering device 106 may comprise a plurality of metering wheels (e.g., metering wheel 143), each being particularly configured to convey a particular type of agricultural product. As noted previously, the metering assembly 134 may be removable from the upper and lower housings 130, 132.

The metering assembly 134 may comprise a sub-shaft 146, the metering wheels 143 positioned on the sub-shaft 146, and a divider 147 positioned on the sub-shaft 146 between the metering wheels 143. The sub-shaft 146 may comprise an elongated, hollow cylinder with an interior passageway having a surface shaped to conform to an exterior surface of a meter shaft discussed in more detail below. To facilitate rotation of the metering wheels 143, an exterior surface of the sub-shaft 146 may be formed with one or more longitudinally-extending grooves or keyways 148 to secure the metering wheels 143 onto the sub-shaft 146 such that rotation of the sub-shaft 146 will cause a corresponding rotation of the metering wheels 143.

The metering wheels 143 may each comprise a hollow interior section and a fluted exterior section. The interior section may include one or more protrusions or keys 149, which are configured to be received in the grooves of the sub-shaft 146 when aligned. As such, the metering wheels 143 may be slid onto the sub-shaft 146 and secured in place via engagement between the keys 149 (of the metering wheels 143) and the keyways 148 (of the sub-shaft 146), such that rotation of the sub-shaft 146 will cause a corresponding rotation of the metering wheels 143. The exterior sections of each of the metering wheels 143 may include a number of flutes 144 or concave grooves within which agricultural product (e.g., seed or treatment) can be received or captured for rotation through the metering device 106. The size of the flutes 144 of each metering wheel 143 can vary depending on the type and size of the agricultural product intended to be processed by the metering device 106.

In addition to the metering assembly 134, certain embodiments of the present invention will provide for the metering device 106 to include gate assembly 136. The gate assembly 136 may comprise a product gate 154 having an elongated, arcuate gate valve 158. When installed within the metering device 106 during operation, the gate valve 158 will be spaced below the metering wheels 143 so as to provide a product channel 159 through which agricultural product can be conveyed by the metering wheels 143. The size of the channel 159 can be adjusted by adjusting a position of the gate valve 158 with respect to the metering wheels 143. For instance, shifting the gate valve 158 downward will create a larger channel 159. Such a larger channel 159 may be preferable when using the metering device 106 to dispense relatively large agricultural products from the bin 104 (e.g., large seeds). Alternatively, shifting the gate valve 158 upward towards the metering wheels 143 will create a smaller channel 159. Such a smaller channel may be preferable when using the metering device 106 to dispense relatively small agricultural products from the bin 104 (e.g., fine seeds). Ensuring the appropriate size of channel 159 for a given agricultural product will ensure consistent and accurate flow of such agricultural product through the metering device 106. In some embodiments, it may be preferable to reduce the product channel 159 to a minimum such that the gate valve 158 is forced upward into contact with the metering wheels 143.

As will be described in more detail below, the position of the gate valve 158 (and thus the size of the channel 159) can be shifted by an adjustment shaft 160, which can extend through each of the metering devices 106 of the drill 100. Specifically, the adjustment shaft 160 may extend through each of the gate assemblies 136 of the metering devices 106, such that rotation of the adjustment shaft 160 will cause a corresponding adjustment to the positions of each of the product gates 154, and particularly to the gate valve 158, with respect to the metering assemblies 134. The adjustment shaft 160 can be rotated by various components or methods. For instance, the adjustment shaft 160 may be connected to a handle or lever 161 (FIG. 2), which can be manually adjusted by an operator of the drill 100. The lever 161 may be securely held in various positions, which correspond with the adjustment shaft 160 and/or the gate valve 158 being securely held in various positions. As was noted above, the gate valve 158 being positioned at various positions (e.g., further away from or closer to the metering wheels 143) will provide for the channel 159 to have a correspondingly larger or smaller size. It is noted that a single lever 161 may be used to rotate the adjustment shaft 160, such that the positions of each of the gate valves 158 of the metering devices 106 through which the adjustment shaft 160 extends can be simultaneously adjusted. As an alternative to the lever 161, the adjustment shaft 160 may be connected to a motor or gear system, which can actuate the adjustment shaft 160 automatically or from a remote command provided by the operator of the drill 100 (e.g., from a cab of the tractor pulling the drill 100).

Figure 6:
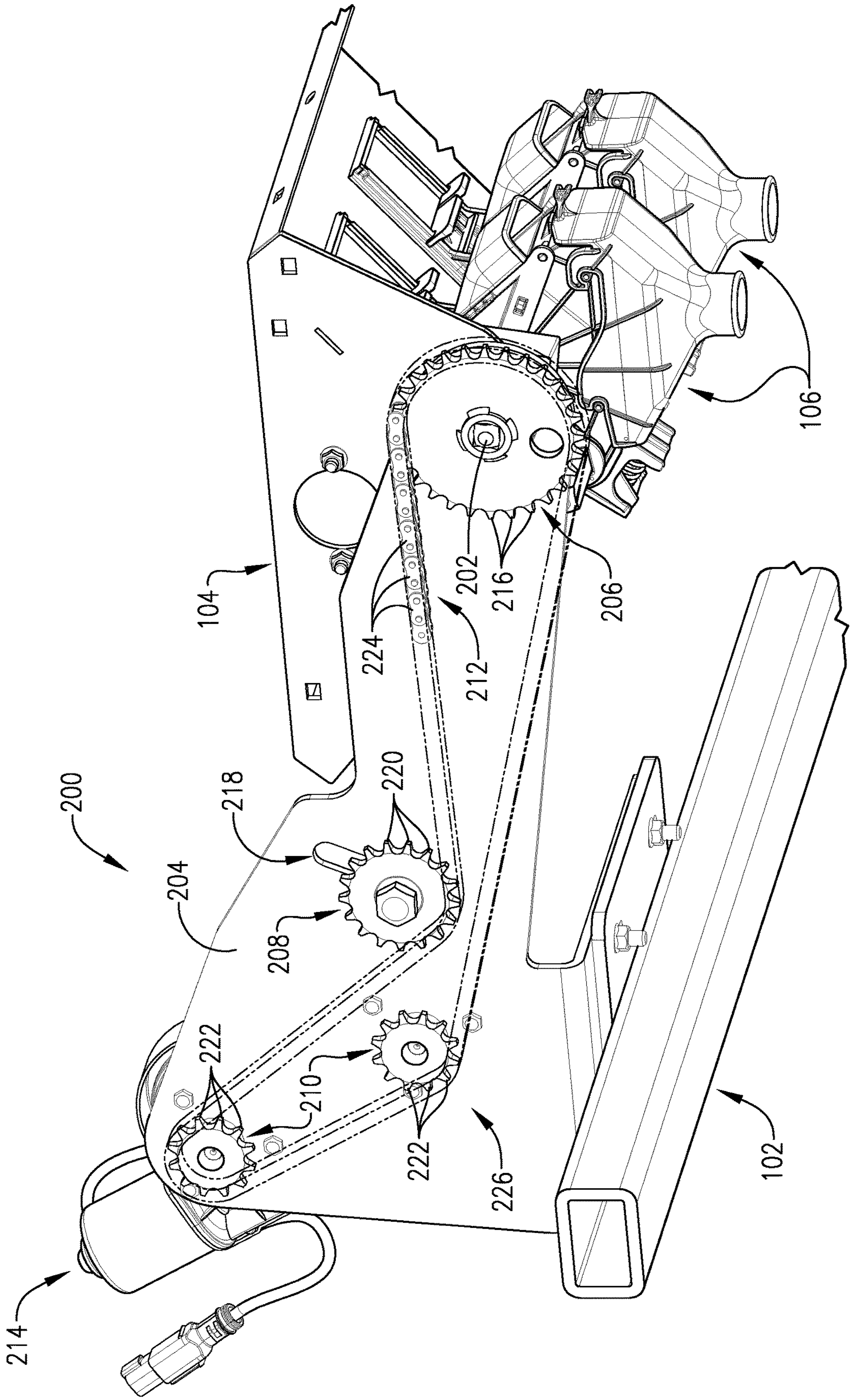
FIG. 6 is a bottom perspective view of a drive system of the agricultural implement of FIG. 1.
Figure 7:
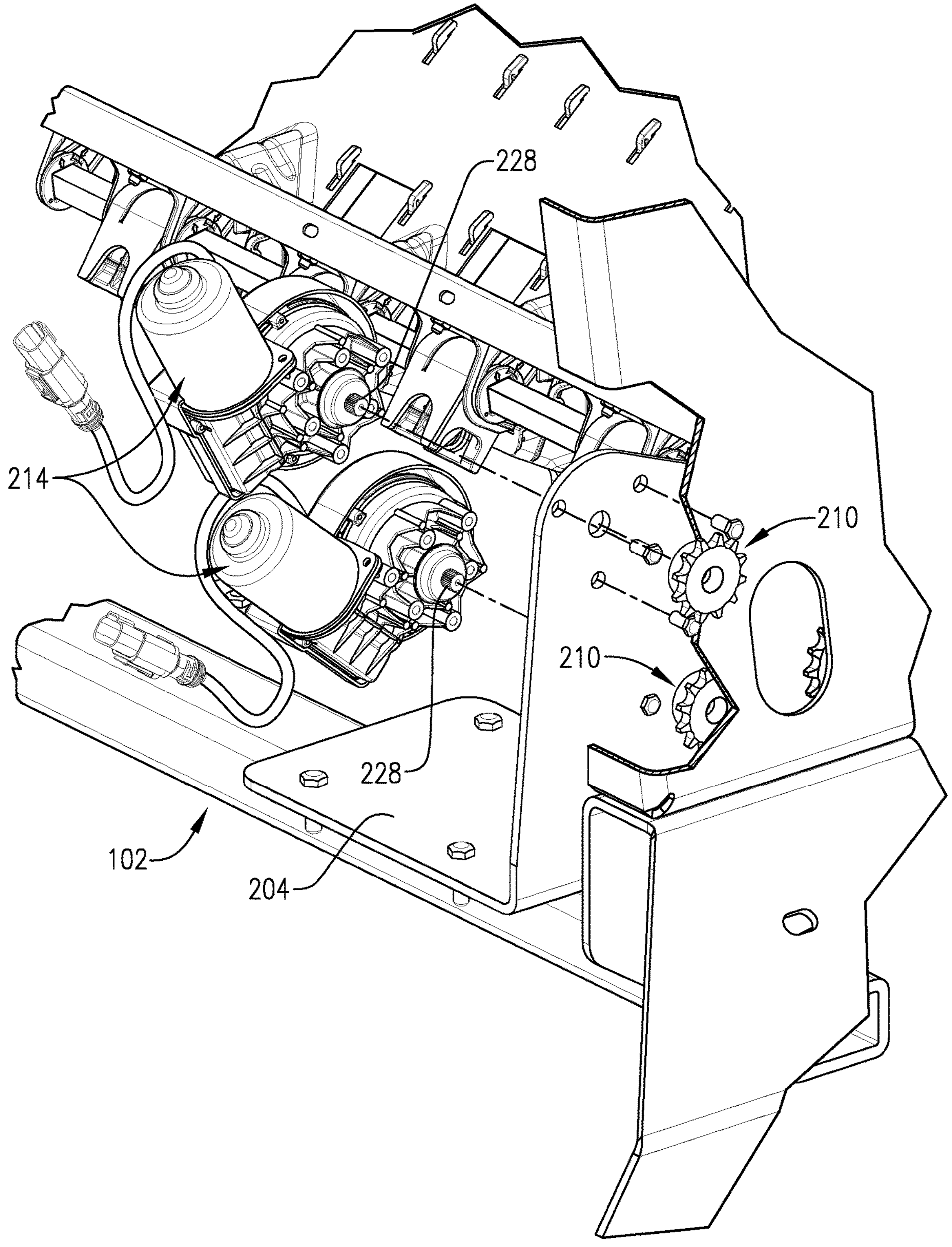
FIG. 7 is a top perspective view of certain components of the drive system of FIG. 6.

Turning to FIGS. 4, 6, and 7, the drive system 200 will now be described in more detail. The drive system 200 broadly comprises a meter shaft 202, a mounting bracket 204, a driven sprocket 206, an idler sprocket 208, a plurality of driver sprockets 210, a chain 212, and a plurality of electric motors 214. The driven sprocket 206, idler sprocket 208, driver sprocket 210, and chain 212 may be considered a drive train 226 drivably connecting the electric motors 214 to the meter shaft 202. Alternative drive trains described in more detail below may be substituted for drive train 226 (see drive systems 300, 400 below). The drive system 200 actuates the metering devices 106, and more particularly, the metering wheels 143 of each metering device 106.

The meter shaft 202 extends laterally between opposing ends of the drill 100 and is rotatably supported by the frame 102. The meter shaft 202 also extends through the sub-shaft 146 of each metering device 106 and is rotationally entrained with each sub-shaft 146 so that the meter shaft 202 is drivably coupled with the metering wheels 143. Furthermore, an end of the meter shaft 202 is drivably coupled with the driven sprocket 206. To that end, the meter shaft 202 may extend through an opening in the mounting bracket 204. In one embodiment, the meter shaft 202 is rectilinear in cross section. In a particular embodiment, the meter shaft 202 has a square cross section.

The driven sprocket 206 is rotatably positioned near the mounting bracket 204 on the end of the meter shaft 202 in alignment with the idler sprocket 208 and the driver sprockets 210. The driven sprocket 206 is drivably coupled with the meter shaft 202 and includes a plurality of teeth 216 configured to engage the chain 212. In one embodiment, the driven sprocket 206 includes a larger number of teeth than the driver sprockets 210 so that the driven sprocket 206 rotates slower than the driver sprockets 210 and with a relatively high torque. In one embodiment, the driven sprocket includes twenty-eight teeth.

The idler sprocket 208 is rotatably mounted on the mounting bracket 204 between the driven sprocket 206 and the driver sprockets 210 and may be adjustably attached to the mounting bracket 204 via slot 218. The idler sprocket 208 takes up slack in the chain 212 to keep the chain 212 engaged with the driven sprocket 206 and the driver sprockets 210 and to prevent chain vibration. In one embodiment, the idler sprocket 208 includes 17 teeth—however, it is not particularly important how many teeth the idler sprocket 208 has because this number no bearing on speed or torque of the drive system 200.

The driver sprockets 210 are rotatably positioned adjacent the mounting bracket 204 in spaced relation with the driven sprocket 206. The driver sprockets 210 are also aligned with the driven sprocket 206 and the idler sprocket 208. Each driver sprocket 210 is drivably coupled with one of the electric motors 214. The driver sprockets 210 include teeth 222 configured to engage the chain 212. In one embodiment, the driver sprockets 210 include a smaller number of teeth than the driven sprocket 206 so that the driver sprockets 210 rotate faster than the driven sprocket 206 and with relatively low torque. In one embodiment, each driver sprocket 210 includes twelve teeth. Alternatively, the driver sprockets 210 may have different numbers of teeth relative to each other and/or may be driven by motors having different operating characteristics. The benefits of such an arrangement will be described in more detail below.

The chain 212 drivably connects the driven sprocket 206, the idler sprocket 208, and the driver sprockets 210 so that rotation of the driver sprockets 210 effects rotation of the idler sprocket 208 and the driver sprockets 210. To that end, the chain 212 includes a plurality of interconnected links 224 that engage teeth on the driven sprocket 206, the idler sprocket 208, and the driver sprockets 210. Alternatively, in the case of pulleys used instead of sprockets, a belt or timing belt may be used to drivably connect the pulleys together.

The electric motors 214 are attached to the mounting bracket 204 and each includes a shaft 228 drivably connected to one of the driver sprockets 210. The electric motors 214 may be substantially identical or may have different operating characteristics from each other. Such operating characteristics may include position, speed, torque, electrical current, voltage, direction of rotation, or the like. The electric motors 214 are communicatively connected to a control system (described below) for receiving control signals therefrom. To that end, one of the electric motors 214 may be designated a leader motor and the other electric motor 214 may be designated a follower motor, the significance of which will be described in more detail below. The electric motors 214 may be coupled with a clutch mechanism such as an over-running clutch for selectively disengaging the electric motors 214 from the metering devices 106.

The control system is communicatively connected to the electric motors 214 (and to at least the lead electric motor) and is configured to transmit command signals thereto. The control system may be or may include an onboard controller, computer, or processor. Alternatively, the control system may be a remote computing device or computer system configured to communicate wirelessly with the electric motors 214. Regardless, the control system may use pulse width modulation (PWM), control area network (CAN) communication, or the like for activating the leader motor.

The control system may implement aspects of the present invention with one or more computer programs stored in or on computer-readable medium residing on or accessible by the processing elements of the control system. Each computer program preferably comprises an ordered listing of executable instructions for implementing logical functions in the processing elements. Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instructions execution system, apparatus, or device. The computer-readable medium can be, for example, an electronic, magnetic, optical, electro-magnetic, infrared, or semi-conductor system, apparatus, or device. More specifically, examples of the computer-readable medium may include an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The leader motor may be configured to receive a command signal from the control system to achieve a first operating state (e.g., a target setting or setpoint). The follower motor may be configured to achieve a second operating state based on the first operating state. In one embodiment, the second operating state may be substantially equal to the first operating state. The operating states may be a speed, a position, a torque, an electric current, a voltage, a direction of rotation, or the like. For example, the electric motors 214 may be synchronized so that the follower motor maintains a precise position and speed matching the leader motor so that each electric motor 214 contributes a portion of the power required to turn the meter shaft 202.

The control system is configured to receive a feedback signal or signals representing current operating states of one or both of the electric motors 214 thus completing a control loop. The control system may be further configured to transmit additional command signals to the leader motor either in furtherance of achieving the first operating state or to proceed to subsequent operating states. For example, the control system may be configured to ramp up the output of the leader motor and hence the follower motor until the electric motors 214 reach a planting speed and later ramp down the output of the leader motor and hence the follower motor until the electric motors 214 stop upon completion of a planting operation.

The control system may also be configured to switch which of the electric motors 214 is a leader motor and which of the electric motors 214 is a follower motor. This may be useful for diagnostic purposes. Similarly, the control system may deactivate one of the electric motors 214 (e.g., the follower motor) such that only one of the electric motors 214 is active. This may be particularly useful when only one of the electric motors 214 is needed to power the metering devices 134. In the same vein, the control system may activate the deactivated electric motor 214 when additional power is needed. In addition, the control system may receive user inputs, configuration information, and other programming for altering performance of the electric motors 214. In this way, the electric motors 214 may be reconfigurable via user inputs.

In operation, agricultural product will flow from the bin 104 into the interior space of the metering device 106 via the product inlet 137 (e.g., through one of the open product doors). The agricultural product is propelled through the interior space of the metering device 106 via rotation of the metering wheels 143 of the metering assembly 134. Specifically, agricultural product will be captured by the flutes 144 on the metering wheels 143, such that rotation of the metering wheels 143 will convey the agricultural product counterclockwise (when viewing FIG. 5), around the interior space of the metering device 106 to the product gate 154. At such point, the metering wheels 143 continue to convey the agricultural product through the channel 159 presented between the metering wheels 143 and the gate valve 158 of the product gate 154 until the agricultural product passes over the gate valve 158 and falls out of the metering device 106 through the product outlet 142. As should be apparent, the size of the channel 159 can be selected to permit a particular type and size of agricultural product to be efficiently conveyed through the metering device 106. For larger agricultural product, the size of the channel 159 can be increased by positioning the gate valve 158 further away from the metering wheels 143 by rotating the gate assembly 136 via rotation of the adjustment shaft 160. Alternatively, for smaller agricultural product, the size of the channel 159 can be decreased by positioning the gate valve 158 closer to the metering wheels 143 by rotating the gate assembly 136 via rotation of the adjustment shaft 160.

The metering wheels 143 of the metering devices 106 are driven by the drive system 200 as controlled by the control system. Specifically, the control system transmits a control signal to the leader motor to achieve a first operating state (e.g., a target setting or setpoint). As described above, the follower motor achieves a second operating state based on the first operating state. In one embodiment, the second operating state may be substantially equal to the first operating state. The operating states may be a speed, a position, a torque, an electric current, a voltage, a direction of rotation, or the like. For example, the electric motors 214 may be synchronized so that the follower motor maintains a precise position and speed matching the leader motor so that each electric motor 214 contributes a portion of the power required to turn the meter shaft 202. The electric motors 214 thereby turn the driver sprockets 210, which actuate the driven sprocket 206 and hence the meter shaft 202 via the chain 212. The meter shaft 202 in turn actuates the metering wheels 143 so that agricultural product is metered through the metering devices 106.

The control system then receives a feedback signal or signals representing current operating states of one or both of the electric motors 214 thus completing a control loop. The control system then transmits additional command signals to the leader motor either in furtherance of achieving the first operating state or to proceed to subsequent operating states. For example, the control system may ramp up the output of the leader motor and hence the follower motor until the electric motors 214 reach a planting speed and later ramp down the output of the leader motor and hence the follower motor until the electric motors 214 stop upon completion of a planting operation.

A method of planting seeds will now be described in more detail. First, a common meter shaft may be connected to a plurality of individual seed meters so that rotation of the common meter shaft causes rotation of the plurality of individual seed meters. Next the common meter shaft may be rotatably driven in a first operating state where n individual electric motors power rotation of the common meter shaft. This may include transmitting a control signal to a first one of the n individual electric motors, with the control signal representing a command to achieve a setpoint. The first one of the n individual electric motors may thereby operate as a leader motor.

The common meter shaft may then be rotatably driven in a second operating state where m individual electric motors power rotation of the common meter shaft, where m is at least one more than n. In other words, at least one additional electric motor may be activated to drive the common motor shaft when additional power is needed or desired. The at least one additional electric motor may operate as a follower motor so as to achieve a second operating state corresponding to the first operating state. The leader and follower motors may have different operating specifications from each other so that the follower motor is operated at a different power output than the leader motor.

Figure 8:
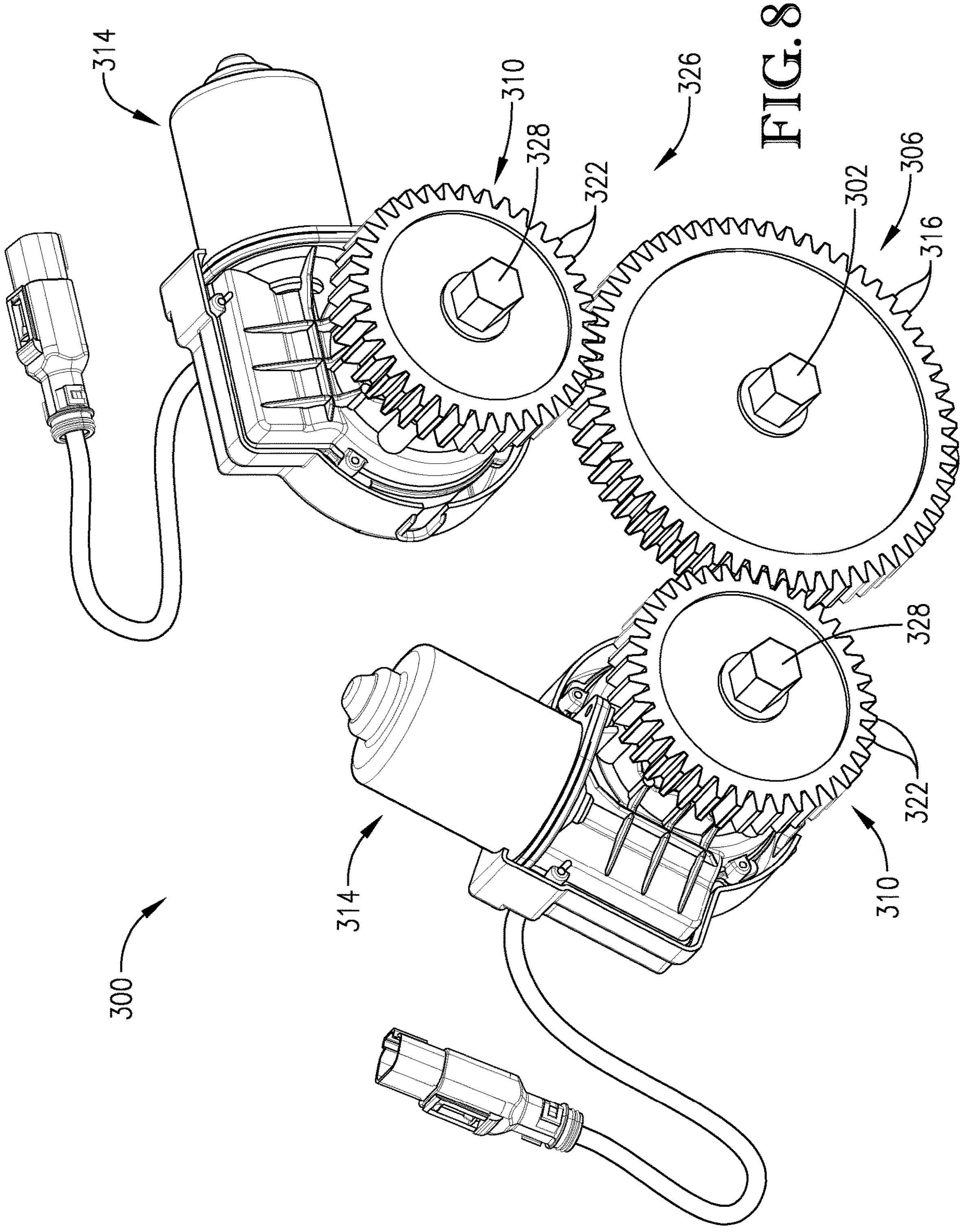
FIG. 8 Is a top perspective view of a drive system constructed according to another embodiment of the invention.

Turning to FIG. 8, a drive system 300 constructed in accordance with another embodiment of the invention will now be described. The drive system 300 broadly comprises a meter shaft 302, one or more mounting brackets (not shown), a driven gear 306, a plurality of driver gears 310, and a plurality of electric motors 314. The driver gears 310 and driven gear 306 form drive train 326 drivably connecting the electric motors 314 to the meter shaft 302. The drive system 300 differs from the above-described drive system 200 in that unlike the use of indirect chain or belt drive, each one of the driver gears 310 is configured to directly engage the driven gear 306.

The meter shaft 302 extends laterally between opposing ends of a drill and is supported by the drill's frame. The meter shaft 302 also extends through the sub-shafts of a plurality of metering devices (not shown) and is rotationally entrained with the sub-shafts so that the meter shaft 302 is drivably coupled with metering wheels of the metering devices. Furthermore, the meter shaft 302 is drivably coupled with the driven gear 306.

The driven gear 306 is drivably coupled with the meter shaft 302 and includes a plurality of teeth 316 configured to engage teeth of the driver gears 310. In one embodiment, the driven gear 306 includes a larger number of teeth than the driver gears 310 so that the driven gear 306 rotates slower than the driver gears 310 and with relatively high torque.

The driver gears 310 are aligned and in driving engagement with the driven gear 306. Each of the driver gears 310 is also drivably coupled with one of the electric motors 314. The driver gears 310 include teeth 322 configured to engage teeth of the driven gear 306. In one embodiment, each of the driver gears 310 includes a smaller number of teeth than the driven gear 306 so that the driver gears 310 rotate faster than the driven gear 306 and with relatively low torque. Alternatively, the driver gears 310 may have different numbers of teeth relative to each other and/or may be driven by motors having different operating characteristics.

The electric motors 314 each include a shaft 328 drivably connected to one of the driver gears 310. The electric motors 314 may be substantially identical or may have different operating characteristics from each other. Such operating characteristics may include position, speed, torque, electrical current, voltage, direction of rotation, or the like. The electric motors 314 are communicatively connected to a control system for receiving control signals therefrom. To that end, one of the electric motors 314 may be designated a leader motor and the other electric motor 314 may be designated a follower motor as described above. The electric motors 314 may be coupled with a clutch mechanism such as an over-running clutch for selectively disengaging the electric motors 314 from the metering devices.

The above-described drive system 300 operates as follows. The leader motor receives a control signal to achieve a first operating state (e.g., a target setting or setpoint). The follower motor achieves a second operating state based on the first operating state. In one embodiment, the second operating state may be substantially equal to the first operating state. The operating states may be a speed, a position, a torque, an electric current, a voltage, a direction of rotation, or the like. For example, the electric motors 314 may be synchronized so that the follower motor maintains a precise position and speed matching the leader motor so that each electric motor 314 contributes a portion of the power required to turn the meter shaft 302. The electric motors 314 thereby turn the driver gears 310, which actuate the driven gear 306 and hence the meter shaft 302. The meter shaft 302 in turn actuates metering wheels of corresponding metering devices so that agricultural product is metered through the metering devices.

Figure 9:
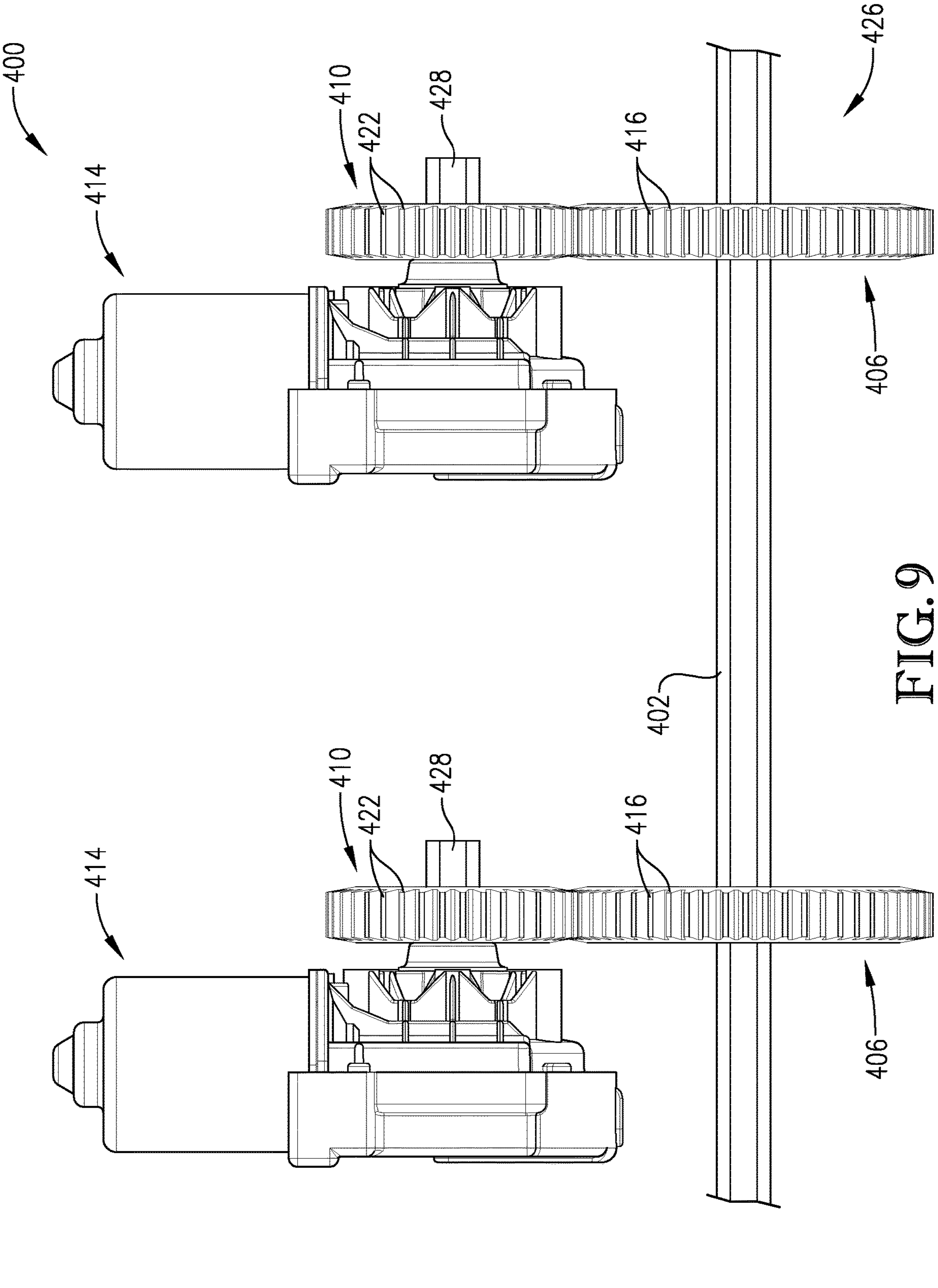
FIG. 9 is a top perspective view of a drive system constructed according to another embodiment of the invention.

Turning to FIG. 9, a drive system 400 constructed in accordance with another embodiment of the invention will now be described. The drive system 400 broadly comprises a meter shaft 402, one or more mounting brackets (not shown), a plurality of driven gears 406, a plurality of driver gears 410, and a plurality of electric motors 414. The driver gears 410 and driven gears 406 form drive train 426 drivably connecting the electric motors 414 to the meter shaft 402. However, the drive train 426 may instead have driven sprockets and driver sprockets drivably connected by chains or driven pulleys and driver pulleys drivably connected by belts. The drive system 400 differs from the above-described drive systems 200, 300 in that the electric motors 414 are drivably connected to the meter shaft 402 at different axial locations on the meter shaft 402 from each other.

The meter shaft 402 extends laterally between opposing ends of a drill and is supported by the drill's frame. The meter shaft 402 also extends through the sub-shafts of a plurality of metering devices (not shown) and is rotationally entrained with the sub-shafts so that the meter shaft 402 is drivably coupled with metering wheels of the metering devices. Furthermore, the meter shaft 402 is drivably coupled with the driven gears 406 at different axial locations on the meter shaft 402. In one embodiment, the meter shaft 402 is rectilinear in cross section. In a particular embodiment, the meter shaft 402 has a square cross section.

The driven gears 406 are drivably coupled with the meter shaft 402 and spaced apart from each other at different locations on the meter shaft 402. Each driven gear 406 includes a plurality of teeth 416 configured to engage teeth of one of the driver gears 410. In one embodiment, the driven gears 406 each include a larger number of teeth than the driver gears 410 so that the driven gears 406 rotate slower than the driver gears 410 and with relatively high torque.

Each of the driver gears 410 are aligned and in driving engagement with one of the driven gears 406. Each of the driver gears 410 is also drivably coupled with one of the electric motors 414. Each of the driver gears 410 includes teeth 422 configured to engage teeth of the driven gears 406. In one embodiment, the driver gears 410 include a smaller number of teeth than the driven gears 406 so that the driver gears 410 rotate faster than the driven gears 406 and with relatively low torque. Alternatively, the driver gears 410 may have different numbers of teeth relative to each other and/or may be driven by motors having different operating characteristics.

The electric motors 414 each include a shaft 428 drivably connected to one of the driver gears 410. The electric motors 414 may be substantially identical or may have different operating characteristics from each other. Such operating characteristics may include position, speed, torque, electrical current, voltage, direction of rotation, or the like. The electric motors 414 are communicatively connected to a control system for receiving control signals therefrom. To that end, one of the electric motors 414 may be designated a leader motor and the other electric motor 414 may be designated a follower motor as described above. At least one of the electric motors 414 may be coupled with a clutch mechanism such as an over-running clutch for selectively disengaging the at least one of the electric motors 414 from the metering devices, which may be useful at least for switching leader/follower roles of the electric motors 414. The leader motor may or may not have a clutch. The clutch may be a frictional clutch or an overrunning clutch such as a wrap spring type clutch. The clutch may be a manually engaged cog drive or a removable pin which may be suitable for infrequent operation thereof.

The above-described drive system 400 operates as follows. The leader motor receives a control signal to achieve a first operating state (e.g., a target setting or setpoint). The follower motor achieves a second operating state based on the first operating state. In one embodiment, the second operating state may be substantially equal to the first operating state. The operating states may be a speed, a position, a torque, an electric current, a voltage, a direction of rotation, or the like. For example, the electric motors 414 may be synchronized so that the follower motor maintains a precise position and speed matching the leader motor so that each electric motor 414 contributes a portion of the power required to turn the meter shaft 402. The electric motors 414 thereby turn the driver gears 410, which actuate the driven gears 406 and hence the meter shaft 402. The meter shaft 402 in turn actuates metering wheels of corresponding metering devices so that agricultural product is metered through the metering devices.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

The invention claimed is:

1. A drive system for delivering a plurality of seeds into a plurality of furrows via a plurality of seed meters, the drive system comprising:

a meter shaft drivably connectable to the plurality of seed meters;

a plurality of electric motors drivably connected to the meter shaft for actuating the plurality of seed meters via the meter shaft, wherein the plurality of electric motors includes a first electric motor operating as a leader motor, and a second electric motor operating as a follower motor; and a control system communicatively connected to the first electric motor and configured to transmit a command signal to the first electric motor for activating the first electric motor to achieve a first operating state.

2. The drive system of claim 1, wherein at least two of the plurality of electric motors are drivably connected to the meter shaft at different axial locations on the meter shaft from each other.

3. The drive system of claim 1, further comprising a drive train, wherein at least two of the plurality of electric motors are drivably connected to the meter shaft at one axial location on the meter shaft via the drive train.

4. The drive system of claim 3, wherein the drive train includes a driven gear coupled to the meter shaft and a driver gear coupled to each one of the plurality of electric motors, each one of the driver gears being configured to directly engage the driven gear.

5. The drive system of claim 3, wherein the drive train includes a driven sprocket coupled to the meter shaft, a driver sprocket coupled to each one of the plurality of electric motors, and a drive chain linking the drive sprockets to the driven sprocket.

6. The drive system of claim 1, wherein at least one of the plurality of electric motors is drivably connected to the meter shaft via a clutch.

7. The drive system of claim 1, wherein the plurality of electric motors includes two motors having different operating specifications from each other.

8. The drive system of claim 1, wherein at least one of the plurality of electric motors is reconfigurable via a user input.

9. A seed drill for delivering a plurality of seeds into a plurality of furrows, the seed drill comprising:

a drive system comprising:

a plurality of seed meters each configured to deliver some of the plurality of seeds into one of the plurality of furrows;

a meter shaft drivably connected to the plurality of seed meters; and a plurality of electric motors drivably connected to the meter shaft for actuating the plurality of seed meters via the meter shaft, the plurality of electric motors including:

a first electric motor operating as a leader motor; and a second electric motor operating as a follower motor; and a control system communicatively connected to the first electric motor and configured to transmit a command signal to the first electric motor for activating the first electric motor to achieve a first operating state.

10. The seed drill of claim 9, wherein the second electric motor is configured to achieve a second operating state based on the first operating state.

11. The seed drill of claim 10, wherein the second electric motor is synchronized with the first electric motor so that the second operating state is substantially equal to the first operating state.

12. The seed drill of claim 10, wherein each of the first operating state and the second operating state are at least one of a speed, a torque, an electric current, a voltage, and a direction of rotation.

13. The seed drill of claim 9, wherein the second electric motor is configured to be switched to operating as a leader motor.

14. The seed drill of claim 9, wherein the first and second electric motors have different operating specifications from each other.

15. The seed drill of claim 9, wherein one of the first and second electric motors is reconfigurable via a user input.

16. The seed drill of claim 9, wherein the first and second electric motors are drivably connected to the meter shaft at different axial locations on the meter shaft from each other.

17. The seed drill of claim 9, the drive system further comprising a drive train, wherein the first and second electric motors are drivably connected to the meter shaft at one axial location on the meter shaft via the drive train.

18. The seed drill of claim 17, wherein the drive train includes a driven gear coupled to the meter shaft and a driver gear coupled to each one of the plurality of electric motors, each one of the driver gears being configured to directly engage the driven gear.

19. The seed drill of claim 17, wherein the drive train includes a driven sprocket coupled to the meter shaft, a driver sprocket coupled to each one of the plurality of electric motors, and a drive chain linking the drive sprockets to the driven sprocket.

20. A seed drill for planting a plurality of seeds in a plurality of furrows, the seed drill comprising:

a drive system comprising:

a plurality of seed meters each configured to deliver some of the plurality of seeds into one of the plurality of furrows;

a meter shaft drivably connected to the plurality of seed meters;

a plurality of electric motors drivably connected to the meter shaft for actuating the plurality of seed meters via the meter shaft, the plurality of electric motors including:

a first electric motor operating as a leader motor; and a second electric motor operating as a follower motor and configured to be switched to operating as a leader motor, the first and second electric motors having different operating specifications from each other; and a drive train drivably connecting the first electric motor and the second electric motor to the meter shaft at one axial location on the meter shaft; and a control system communicatively connected to the first electric motor and configured to transmit a command signal via pulse width modulation (PWM) control area network (CAN) communication to the first electric motor for activating the first electric motor to achieve a first operating state, the second electric motor being synchronized with the first electric motor to achieve a second operating state substantially equal to the first operating state, the first and second operating states being at least one of a speed, a torque, an electric current, a voltage, and a direction of rotation.

21. A method of planting seeds, the method comprising steps of:

(a) connecting a common meter shaft to a plurality of individual seed meters so that rotation of the common meter shaft causes rotation of the plurality of individual seed meters; and (b) driving rotation of the common meter shaft via a plurality of individual electric motors, (c) before step (b), driving rotation of the common meter shaft in a first operating state where n individual electric motors power rotation of the common meter shaft, wherein step (b) includes driving rotation of the common meter shaft in a second operating state where m individual electric motors power rotation of the common meter shaft, wherein m is at least one more than n, wherein said n individual electric motors includes a first electric motor, said m individual electric motors includes the first electric motor and a second electric motor, and the method further comprises a step of synchronizing the second electric motor to the first electric motor before step (b), wherein the first electric motor operates as a leader motor and the second electric motor operates as a follower motor in step (b), the method further comprising a step of transmitting a signal to the first electric motor representing a command to achieve a setpoint so that the first and second electric motors achieve the setpoint.

22. The method of claim 21, wherein the first electric motor and the second electric motor have different operating specifications from each other, and the method further comprises a step of operating the second electric motor at a different power output than the first electric motor.

* * * * *